United States Patent
Jaramillo et al.

(10) Patent No.: US 12,286,749 B2
(45) Date of Patent: Apr. 29, 2025

(54) PRINTING OF FIBER BLENDS, WOVEN AND NON-WOVEN OR KNIT FABRIC

(71) Applicant: Archroma IP GmbH, Reinach (CH)

(72) Inventors: Joaquin Femat Jaramillo, Barcelona (ES); Marc Sabat Rius, Barcelona (ES)

(73) Assignee: Archroma IP GmbH, Reinach (CH)

( * ) Notice: Subject to any disclaimer, the term of this patent is extended or adjusted under 35 U.S.C. 154(b) by 0 days.

(21) Appl. No.: 18/041,082

(22) PCT Filed: Dec. 17, 2021

(86) PCT No.: PCT/EP2021/086432
§ 371 (c)(1),
(2) Date: Feb. 9, 2023

(87) PCT Pub. No.: WO2022/129486
PCT Pub. Date: Jun. 23, 2022

(65) Prior Publication Data
US 2023/0313450 A1    Oct. 5, 2023

(30) Foreign Application Priority Data

Dec. 18, 2020    (EP) .................................... 20383123

(51) Int. Cl.
*D06P 1/41*    (2006.01)
*C09D 11/033*    (2014.01)
(Continued)

(52) U.S. Cl.
CPC .............. *D06P 1/41* (2013.01); *C09D 11/033* (2013.01); *C09D 11/037* (2013.01);
(Continued)

(58) Field of Classification Search
CPC ...... D06P 1/41; D06P 1/42; D06P 1/44; D06P 1/525; D06P 1/5257; D06P 1/5264;
(Continued)

(56) References Cited

U.S. PATENT DOCUMENTS 3,706,524 A * 12/1972 Flensberg ................. D06P 1/62
8/909
3,986,824 A * 10/1976 Waibel ............... D06B 11/0073
8/479
(Continued)

FOREIGN PATENT DOCUMENTS

CN    106436367 A    2/2017
DE    102009039606 B3 *    1/2011    ............... D06P 1/08
(Continued)

OTHER PUBLICATIONS

Machine translation of DE 102009039606 via EPO (Year: 2011).*
(Continued)

*Primary Examiner* — Ian A Rummel
*Assistant Examiner* — Rebecca L Grusby
(74) *Attorney, Agent, or Firm* — Wood Herron & Evans LLP

(57) ABSTRACT

The present invention relates to a composition for printing a fiber blend, yarn, woven or non-woven or knit fabric comprising or consisting of at least acrylic, aramid, and optionally wool, a process for producing the composition, use of the composition, a process for printing said fiber blend, yarn, woven or non-woven or knit fabric, as well as to the printed fiber blend, yarn, woven or non-woven or knit fabric and the use thereof to manufacture goods like cloths therefore.

14 Claims, 3 Drawing Sheets

1.5

(51) Int. Cl.
  *C09D 11/037* (2014.01)
  *D06P 3/18* (2006.01)
  *D06P 3/24* (2006.01)
  *D06P 3/34* (2006.01)
  *D06P 3/82* (2006.01)
  *D06P 5/20* (2006.01)

(52) U.S. Cl.
  CPC .............. *D06P 5/2077* (2013.01); *D06P 3/18* (2013.01); *D06P 3/242* (2013.01); *D06P 3/342* (2013.01); *D06P 3/8276* (2013.01)

(58) Field of Classification Search
  CPC .......... D06P 3/002; D06P 3/022; D06P 3/041; D06P 3/18; D06P 3/242; D06P 3/342; D06P 3/72; D06P 3/76; D06P 3/8204; D06P 3/8209; D06P 3/8261; D06P 3/8271; D06P 3/8276; D06P 3/82; C09D 17/001; C09D 17/004; C09D 17/005; C09D 17/008
  USPC ...................................................... 8/531, 534
  See application file for complete search history.

(56) References Cited

U.S. PATENT DOCUMENTS

| | | | | |
|---|---|---|---|---|
| 4,015,933 | A * | 4/1977 | Koller | D06P 3/8271 8/606 |
| 4,438,169 | A * | 3/1984 | Daniels | D06P 1/44 428/206 |
| 4,543,128 | A | 9/1985 | Troesch et al. | |
| 4,981,488 | A * | 1/1991 | Cates | D06P 3/241 8/492 |
| 5,275,627 | A * | 1/1994 | Cates | D06P 3/241 8/490 |
| 6,451,070 | B1 * | 9/2002 | Kent | D06P 1/5257 8/445 |
| 2005/0204487 | A1 * | 9/2005 | Zhu | D06P 3/8271 8/531 |
| 2007/0226919 | A1 * | 10/2007 | Mheidle | D06P 1/0032 8/445 |
| 2010/0319140 | A1 * | 12/2010 | Wegdam | D06P 3/60 8/496 |
| 2014/0020190 | A1 * | 1/2014 | Oiwa | D06P 5/001 8/115.56 |
| 2020/0063299 | A1 * | 2/2020 | Tanaka | D03D 15/283 |

FOREIGN PATENT DOCUMENTS

| | | | |
|---|---|---|---|
| GB | 1118396 | A | 7/1968 |
| GB | 1444426 | A | 7/1976 |
| JP | S63315681 | A * | 12/1988 |
| JP | 2009057652 | A | 3/2009 |
| JP | 2017190542 | A | 10/2017 |

OTHER PUBLICATIONS

Azam et al., "An Investigation Into the Effect of Different Parameters on the Dyeing of High-Performance M-Aramid Fiber and Its Optimization", doi:10.1177/0887302X19870872 (Year: 2019).*
Machine translation of JP S63315681 via EPO (Year: 1988).*
Database WPI Week 201732 Thomson Scientific, London, GB; AN 2017-158716 XP002803105.
Database WPI Week 201773 Thomson Scientific, London, GB; AN mixed 2017-714239 XP002803106.
Database WPI Week 200924 Thomson Scientific, London, GB; AN 2009-G09107 XP002803107.
PCT Office, International Search Report and Written Opinion issued in PCT/EP2021/086432 dated May 3, 2022.

* cited by examiner

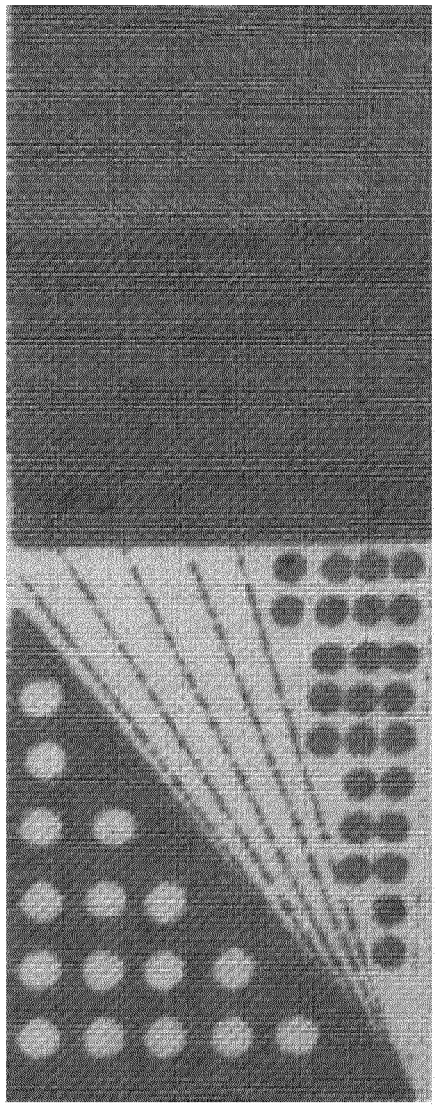
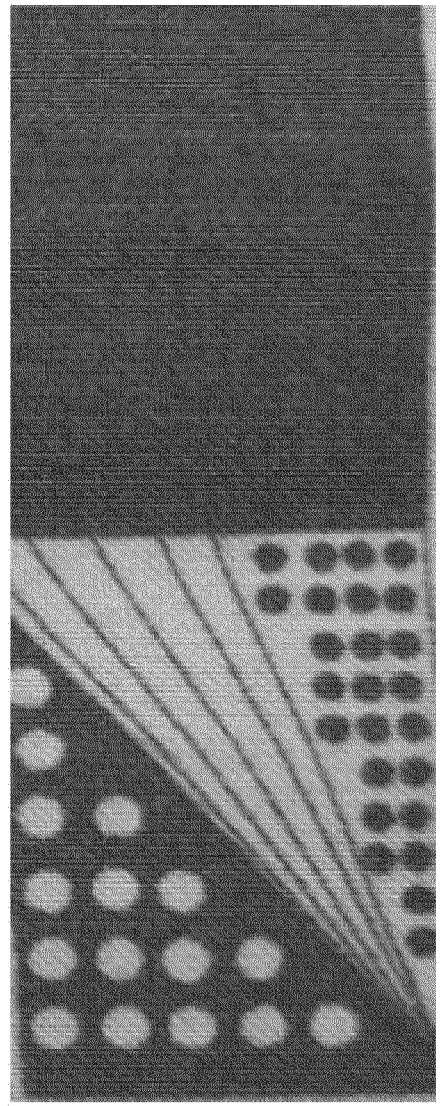
Fig. 2a                                    Fig. 2b

PRINTING OF FIBER BLENDS, WOVEN AND NON-WOVEN OR KNIT FABRIC

FIELD OF THE INVENTION

The present invention relates to a composition for printing a fiber blend, yarn, woven or non-woven or knit fabric comprising or consisting of at least acrylic, aramid, and optionally wool, a process for producing the composition, use of the composition, a process for printing said fiber blend, yarn, woven or non-woven or knit fabric, as well as to the printed fiber blend, yarn, woven or non-woven or knit fabric and the use thereof to manufacture goods like cloths therefore.

BACKGROUND OF THE INVENTION

Modern functional textiles are often a mixture of different fibers made from different materials. Depending on the demand on the functional textile, respective fiber blends are used. E.g. underwear should have a soft feeling on the skin, keep the fit during wear, and should be able to absorb moisture. Thus, underwear is often made of a fiber blend of cotton (good in absorbing moisture) and elastane (improves the soft feeling and due to its elasticity improves the fit). In order to get a colored underwear with a homogenic color shade, the respective dyes or the dye composition has to be carefully selected, since not every fiber (or material of the fiber) can be colored with every dye.

There are four main "groups" of dyes: acid dyes, reactive dyes, cationic dyes and disperse dyes. The challenge is, to use a dye or a dye composition (e.g. a combination of a reactive dye and an acid dye) which colors all materials of a fiber blend while providing a good light fastness, color shade, etc.

One particularly difficult fiber to be colored is a fiber made of aramid, in particular para-aramid. Fibers made of para-aramid already have a typical golden color, which is often not suitable for the desired applications; e.g. body armor used by the police or the army are made of para-aramid fabric. Cationic dyes are the only dyes suitable to color para-aramid fiber or fabrics. Cationic dyes, however, have the disadvantage of poor light fastness. In addition, if a fiber blend of e.g. para-aramid and other fibers should be colored homogenously, cationic dyes must be used together with other colorants (e.g. selected from acid dyes, reactive dyes or pigments) within the same colorant composition.

OBJECTS OF THE INVENTION

It is therefore an object of the present invention to provide a composition capable of coloring a fiber blend, yarn, woven, non-woven or knit fabric or woven comprising acrylic, aramid, in particular para-aramid and optionally wool, while improving the light fastness of the colored fiber blend, yarn, woven, non-woven or knit fabric at the same time.

SUMMARY OF THE INVENTION

The object is solved by the following items:

Item 1: Aqueous composition for printing a fiber blend, yarn, woven, non-woven or knit fabric comprising or consisting of acrylic and aramid, wherein the composition comprises: a) at least one cationic dye, b) at least one dispersion comprising at least one pigment, c) at least one leveling agent, d) at least one solvent, e) at least one binder.

Item 2: Aqueous composition according to item 1, wherein the composition contains further at least one reactive dye or at least one acid dye.

Item 3: Aqueous composition according to at least one of the items 1 or 2, wherein the at least one leveling agent is selected from fatty acids; ethylene urea; fatty alcohol or sulphates thereof; fatty amines or sulphated fatty amine, alkyl aryl or sulphonates thereof; fatty alcohol ethylene oxide; phosphatic salts; aliphatic polyglycol ether; triazine derivates; or mixtures thereof.

Item 4: Aqueous composition according to at least one of the items 1 to 3, wherein the composition comprises further at least one stabilizer selected from acrylate polymer(s), acrylamide copolymer(s), alkylphenol polyglycol ether, or mixtures thereof.

Item 5: Aqueous composition according to at least one of the items 1 to 4 wherein the composition further comprises additives selected from the group comprising thickener, acid donor, or mixtures thereof.

Item 6: Aqueous composition according to at least one of the items 1 to 5, wherein the composition comprises: 0.01 to 7% by weight of at least one cationic dye; 0.01 to 3% by weight of at least one dispersion comprising at least one pigment; 4 to 12% by weight of at least one solvent; 4 to 12% by weight of at least one leveling agent; 0.5 to 12% by weight of at least one binder; 0 to 4% by weight of at least one stabilizer; 0 to 7% by weight of at least one reactive dye; or 0 to 7% by weight of at least one acid dye; 0 to 8% by weight of at least one thickener; 0 to 5% by weight acid donor; based on 100% by weight of the total composition; wherein the remainder to 100% by weight is water.

Item 7: Aqueous composition according to at least one of the items 1 to 6, wherein the composition comprises: 0.1 to 5% by weight of at least one cationic dye; 0.01 to 5% by weight of at least one reactive dye; or 0.01 to 5% by weight of at least one acid dye; 1 to 10% by weight of at least one binder; 0.01 to 2.5% by weight of at least one dispersion comprising at least one pigment; 5 to 11% by weight of at least one solvent; 5 to 11% by weight of at least one leveling agent; 0.1 to 4% by weight of at least one stabilizer, 1 to 5% by weight of at least one thickener; 1 to 3% by weight of at least one acid donor; based on 100% by weight of the total composition, wherein the remainder to 100% by weight is water.

Item 8: Process for manufacturing the aqueous composition according to at least one of the items 1 to 7, comprising the following steps: Step A: Mixing and homogenizing all components for the composition according to at least one of the items 1 to 7, except the at least one cationic dye and the at least one dispersion comprising the at least one pigment; Step B: Adding the at least one cationic dye and the at least one dispersion comprising the at least one pigment to the mixture obtained in Step A; Step C: Mixing and homogenizing the mixture obtained in Step B.

Item 9: Use of the aqueous composition according to at least one of the items 1 to 7 or use of the aqueous composition produced according to the process as described in item 8 for printing a fiber blend, yarn, woven, non-woven or knit fabric comprising or consisting of acrylic and aramid.

Item 10: Use according to item 9 for printing a fiber blend, yarn, woven, non-woven or knit fabric further comprising wool, or consisting of acrylic, aramid and wool.

Item 11: Process for printing a fiber blend, yarn, woven, non-woven or knit fabric comprising or consisting of acrylic and aramid and optionally wool comprising the following steps: Step 1: Printing the fiber blend, yarn, woven, non-woven or knit fabric using the aqueous composition according to at least one of the items 1 to 7, or printing the fiber blend, yarn, woven, non-woven or knit fabric using the aqueous composition produced according to item 8; Step 2: Drying of the printed fiber blend, yarn, woven, non-woven or knit fabric obtained in Step 1 at temperatures of between 100° C. to 200° C.; Step 3: Fixation of the at least one cationic dye present in the aqueous composition according to at least one of the items 1 to 7 or manufactured according to item 8 on the fiber blend, yarn, woven, non-woven or knit fabric by subjecting the printed fiber blend, yarn, woven, non-woven or knit fabric obtained in Step 2 to a steam process by applying saturated steam for at least 10 minutes and up to 50 minutes at a temperature of at least 90° C. up to 110° C.; Step 4: Subjecting the printed fiber blend, yarn, woven, non-woven or knit fabric obtained in Step 3 to a curing step at a temperature of at least 130° C. up to 200° C. for at least 1 minute up to 7 minutes; Step 5: Subjecting the printed fiber blend, yarn, woven, non-woven or knit fabric obtained in Step 4 to a washing step; Step 6: Subjecting the printed fiber blend, yarn, woven, non-woven or knit fabric obtained in Step 5 final drying step at a temperature of at least 100° C. up to 200° C.

Item 12: Printed fiber blend, yarn, woven, non-woven or knit fabric comprising or consisting of acrylic and aramid and optionally wool, wherein the fiber blend, yarn, woven, non-woven or knit fabric comprises as colorant at least one cationic dye and at least one pigment originating from the aqueous composition according to at least one of the items 1 to 7, or the aqueous composition produced according to the process as described in item 8.

Item 13: Printed fiber blend, yarn, woven, non-woven or knit fabric according to item 12, wherein the printed fiber blend, yarn, woven, non-woven or knit fabric comprises 30 to 50% by weight of acrylic, 30 to 50% by weight of aramid and 0 to 25% by weight of wool based on 100% by weight of the fiber blend, yarn, woven or knit fabric.

Item 14: Printed fiber blend, yarn, woven, non-woven or knit fabric comprising or consisting of acrylic, aramid and optionally wool, wherein the fiber blend, yarn, woven, non-woven or knit fabric is printed according to the process as described in item 11, or printed with the aqueous composition according to at least one of the items 1 to 7, or printed with the aqueous composition produced according to item 8.

Item 15: Printed fiber blend, yarn, woven, non-woven or non-woven or knit fabric according to at least one of the items 12 to 14 used for manufacturing protection cloth for army and police uniforms and equipment like backpacks, camping tents or ownings.

BRIEF DESCRIPTION OF THE DRAWINGS

FIG. 2a shows a fabric printed with a composition according to the invention except that no leveling agent is present in the composition; and FIG. 2b shows a fabric printed with a composition according to the invention comprising the leveling agent.

DETAILED DESCRIPTION OF THE INVENTION

Figure 1A:
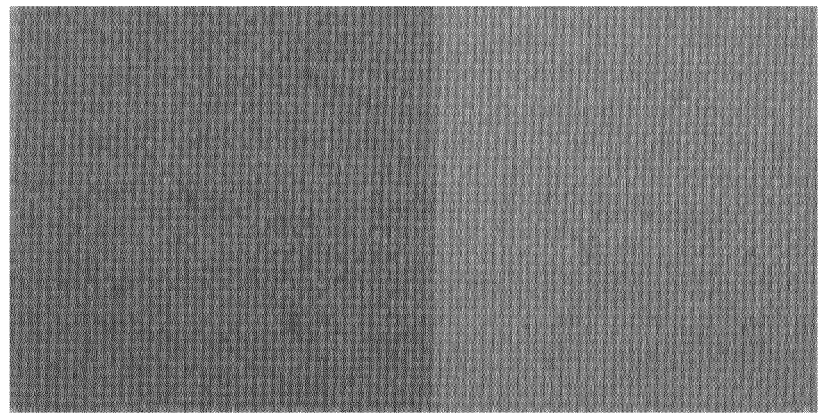
FIG. 1a shows a fabric printed with a composition containing a cationic dye, but no dispersion containing at least one pigment.

The object of the present invention is solved by an aqueous composition comprising at least one cationic dye, at least one dispersion comprising at least one pigment, at least one leveling agent, at least one binder and at least one solvent.

The aqueous composition according to the invention has the advantage of being used for homogenously printing fiber blends, yarn, woven, non-woven or knit fabric comprising or consisting of acrylic, aramid, in particular para-aramid and optionally wool. Further, the aqueous composition according to the invention has the advantage of providing good light fastness and printing quality. The aqueous composition according to the invention is preferably designed as printing paste.

The term "fabric" is used within the context of the present application as general term for "fiber", "fiber blend", "yarn", "knit fabric", "non-woven" and "woven" fabrics.

The term "fiber blend" as used within the context of the present application means that at least two fibers are combined to one fiber blend by commonly known spinning methods, wherein the at least two fibers are made of different materials: at least one fiber is made of or consisting of acrylic (such fibers are known for example under the tradename "Pyrotex" obtainable from PyroTex, Hamburg), wherein the second fiber is made of or consisting of aramid, preferably para-aramid. Thus, the term fiber blend as used within the context of the present applications refers to a combination of at least two fibers, wherein one of the fibers is made of acrylic and wherein the second fiber is made of aramid, preferably para-aramid.

The term fiber blend further encompasses embodiments in which the fiber blend comprises or consists of at least three or more fibers, wherein the three or more fibers are made of different material, e.g. the first fiber is made of acrylic, the second fiber is made of aramid, preferably para-aramid, the third, fiber is made of or consisting of a material which is different from acrylic and aramid, the fourth fiber is made of or consisting of a material which is different from acrylic, aramid and the material of the third fiber. In a preferred embodiment, the fiber blend comprises or consists of three different fibers: the first fiber is made of acrylic, the second fiber is made of aramid, preferably para-aramid and the third fiber is made of a material which is different from acrylic and aramid. Particularly suitable as material for the third fiber is wool. Such a fiber blend can for example be obtained also from PyroTex, Hamburg. The advantage of a fiber blend comprising or consisting of three fibers made of wool, aramid, and acrylic fiber, in particular Pyrotex, is the high flame retardancy, improved anti-virus rate while providing at the same time a very comfortable feeling during wear.

The term "woven" as used within the context of the present application refers to a two dimensional or three-dimensional fabric which is made of yarn by weaving methods. The yarn used for making woven consists of the fiber blend as defined above. The term "yarn" as used within the context of the present application refers to an agglomeration of a fiber blend, wherein the agglomeration is achieved by spinning methods. This means that a yarn can contain two or more of the above defined fiber blends, depending on the desired yarn properties, like strength or thickness.

The term "non-woven" as used within the context of the present application refers to a two dimensional or three-dimensional fabric which is made of yarn bonded together by chemical, mechanical, heat or solvent treatment, i.e. by methods being different from weaving methods. The yarn used for making non-woven consists of the fiber blend as defined above. The term "yarn" as used within the context of the present application refers to an agglomeration of a fiber blend, wherein the agglomeration is achieved by spinning methods. This means that a yarn can contain two or more of the above defined fiber blends, depending on the desired yarn properties, like strength or thickness.

The term "knit fabric" as used within the context of the present application refers to a two- or three-dimensional fabric which is made of yarn, as defined above, by knitting methods.

The term "printing" as used within the context of the present application refers to a method of applying color to a fabric, in particular to fiber(s), yarn, woven, non-woven and knit fabric. In the prior art, this process is also referred to as "textile printing". The color is usually applied as dye or pigment. According to the present invention, at least one cationic dye is used to apply the color to the fabric, in particular to the fiber blend, yarn, woven, non-woven and knit fabric. Optionally additional dyes like reactive dyes and/or acid dyes can also be used in combination with the at least one cationic dye. In course of the printing process, or in course of finishing steps (like curing steps etc.), the applied dye(s) is (are) fixed to the fabric, in particular the fiber blend, yarn, woven, non-woven and knit fabric such that the dye(s) cannot be washed off or otherwise removed from the fabric, in particular the fiber blend, yarn, woven, non-woven and knit fabric anymore. There are numerous printing methods for printing fabric, in particular the fiber blend, yarn, woven, non-woven and knit fabric, known in the art: e.g. block printing, perrotine printing, roller, cylinder or machine printing, stencil printing, screen-printing or flat printing, digital textile printing, flexo textile printing. The aqueous composition according to the invention is suitable to be used in every known method for printing fabrics, in particular for printing fiber blends, yarn, woven, non-woven and knit fabric. The printing process or the printed fabric, is particularly characterized in that definite patterns or designs are applied to the fabric, in particular the fiber blends, yarn, woven, non-woven and knit fabric. The term "printed" as used within the context of the present application therefore refers to a fabric, in particular to the fiber blend, yarn, woven, non-woven and knit fabric which has been subjected to a printing process as defined above by applying color to the fabric, in particular the fiber blend, yarn, woven, non-woven and knit fabric by using the aqueous composition according to the invention.

The term "wool" as used within the context of the present application refers to a natural fiber of animal origin. Typically, wool is obtained from sheep and also other animals like rabbits (angora), goats (cashmere and mohair), muskoxen (qiviut) and camelids. Wool is built from a particular kind of fibrous structural proteins (also known as scleroproteins) called keratin, containing disulfide bridges. Wool has several desired properties: good fire resistant, low density which makes it possible to produce light weight fabrics, having good thermal insulation properties, good lightfastness when colored, good water absorption properties, but at the same time, wool is able to release the absorbed water easily, thus giving a dry feeling, antistatic properties, self-cleaning properties (i.e. bad odors are released after being ventilated). Wool fibers can be colored with acid dyes, reactive dyes or pigments.

The term "aramid" as used within the context of the present application refers to a synthetic fiber made of aromatic polyamides. Said aromatic polyamides are obtained by reaction of aryl containing dicarboxylic acid(s) with aryl containing diamine compound(s). Aramid fibers are heat-resistant and strong fibers having a high melting point. Commonly known aramid fibers are for example Kevlar, Nomex or Twaron. In essence, there are two different "classes" of aramids: meta-aramid and para-aramid. The difference between meta-aramid and para-aramid is the substitution of the aromatic ring. If the amide bonds between two aryl moieties are in para-position to each other, the aramid is a para-aramid (e.g. Kevlar, Twaron), whereas if the amide bonds between two aryl moieties are in meta-position to each other, the aramid is a meta-aramid (e.g. Nomex). Para-aramid has a characteristically golden color. Aramid fibers can be colored only with cationic dyes.

The term "acrylic" as used within the context of the present application refers to a synthetic fiber made by polymerization of acrylonitrile monomers optionally together with one or more comonomers like vinyl acetate or methyl acrylate. Typically, acrylonitrile is present in an amount of 85 wt % in the acrylic fiber. "Modacrylic" as used within the context of the present application are modified acrylic fibers (and thus are also encompassed by the term "acrylic" within the context of the present application) characterized in that the amount of acrylonitrile present in the fiber is at most 85 wt %, wherein the reminder is made of other comonomers. In addition, acrylic as well as modacrylic fibers can be further modified by chemical and/or physical means in order to further improve properties like flame retardancy or the like. Acrylic fibers have self-extinguishing properties and are hard to ignite, and thus are flame retardant. In addition, acrylic fibers and fabrics made thereof are wool-like, i.e. soft, warm, having a high dimension stability and good elasticity. In addition, acrylic fibers are poor heat conductors. One particularly advantageous acrylic fiber is sold under the tradename Pyrotex (by Pyro-Tex, Hamburg). Acrylic fabrics, in particular fiber blends, yarn, woven, non-woven and knit fabric can be colored with cationic dyes, acid dyes and reactive dyes.

The term "cationic dye(s)" as used within the context of the present application are also known as basic dye(s) in the prior art and are synthetic dyes acting as bases. Cationic dyes form colored cationic salts (i.e. cationic groups are formed within the dye structure) when being made soluble in water. These cationic groups react with anionic groups on the surface of the substrate which is to be colored. Cationic dyes produce bright shades with high tinctorial strength. Cationic dye(s) are the only dyes capable of coloring (e.g. by printing) aramid, in particular para-aramid based fabric, in particular fiber blends, yarn, woven, non-woven and knit fabric. The main disadvantage of cationic dyes is their poor light fastness. Suitable cationic dyes are represented by the following formulae:

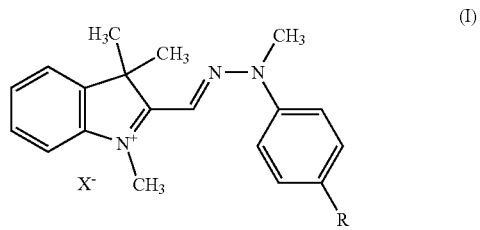

wherein R signifies —OCH$_3$, —CH$_3$ and X signifies Cl$^-$, CH$_3$OSO$_3^-$;

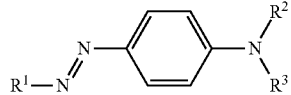

wherein R$^1$ signifies one of the following formulae (IIa), (IIb) and (IIc), wherein the * represents the attachment to the azo bond of the azo compound (II)

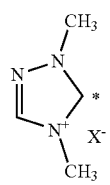

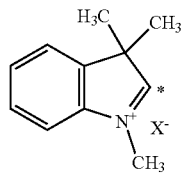

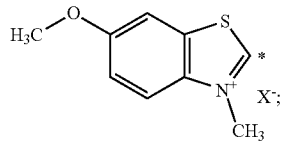

wherein R$^2$ signifies methyl or ethyl, R$^3$ signifies methyl, ethyl, —CH$_2$CH$_2$OH, —CH$_2$C$_6$H$_5$, and X signifies Cl$^-$, CH$_3$OSO$_3^-$. Further, suitable cationic dyes are known under the following color index numbers (C.I. numbers): C.I. Basic Yellow 24 (CAS: 52435-14-0), C.I. Basic Yellow 28 (CAS: 54060-92-3), C.I. Basic Yellow 29 (CAS: 39279-59-9), C.I. Basic Yellow 13 (CAS: 12217-50-4), C.I. Basic Yellow 82 (CAS: 12227-67-7), C.I. Basic Orange 22 (CAS: 4657-00-5), C.I. Basic Red 46 (CAS: 12221-69-1), C.I. Basic Red 14 (CAS: 12217-48-0), C.I. Basic Red 29 (CAS: 42373-04-6), C.I. Basic Blue 3 (CAS: 33203-82-6), C.I. Basic Blue 41 (CAS: 12270-13-2), C.I. Basic Blue 54 (CAS: 15000-59-6), C.I. Basic Blue 141 (CAS: 63641-90-7), C.I. Basic Brown 4 (CAS: 5421-66-9) The at least one cationic dye is preferably present in an amount of at least 0.01% by weight, or at least 0.1% by weight, or at least 0.5% by weight, or at least 1% by weight, or at least 1.5% by weight, or at least 2% by weight and at most 7% by weight, or at most 6% by weight, or at most 5% by weight, or at most 4% by weight; or of at least 0.01 to at most 7% by weight, or at least 0.1 to at most 5% by weight or at least 0.5 to at most 4% by weight, based on 100% by weight of the total aqueous composition according to the invention.

The term "reactive dye" as used within the context of the present application also known as "fiber-reactive azo dyes". Reactive dyes are well known in the art. Reactive dyes are characterized in that the chromophore of the dye contains one or more substituents capable of reacting with a substrate like fiber blends, yarn, woven, non-woven and knit fabric consisting of or comprising e.g. aramid or acrylic. Reactive dyes are a class of organic substances dyes that contain at least one substituent which reacts with the substrate and thus forms a covalent bond between the molecule of the dye and the substrate to be colored. For example, WO 2007/039573 A2 relates to azo reactive dyes and mixtures of fiber-reactive azo dyes, to processes for their preparation and to their use for dyeing and printing hydroxyl- and carboxamido-containing materials. Furthermore WO 2004/088031 also discloses to azo reactive dyes and mixtures of fiber reactive dyes, their preparation and their use. WO 2015/149940 relates to compounds that are obtained by coupling two aminoaryl compounds in diazotized form onto 3-aminophenlyurea. These compounds are used as azo reactive dyes in dyeing and printing processes. Suitable reactive dyes are represented by the following formulae:

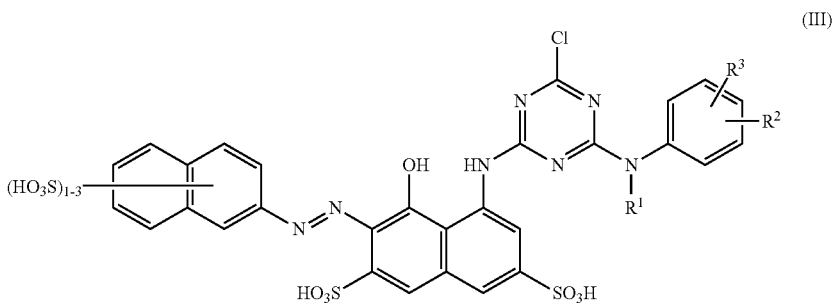

wherein R¹ signifies H, methyl, ethyl; R² signifies —SO₃⁻X⁺; R³ signifies H, methyl or —SO₃⁻X⁺, wherein X⁺ signifies a cation selected from the group consisting of H⁺, Li⁺, Na⁺, K⁺, NR₄⁺ wherein R signifies one or more of H, $C_1$ to $C_6$ branched or unbranched alkyl residue; or mixtures of one or more of these cations;

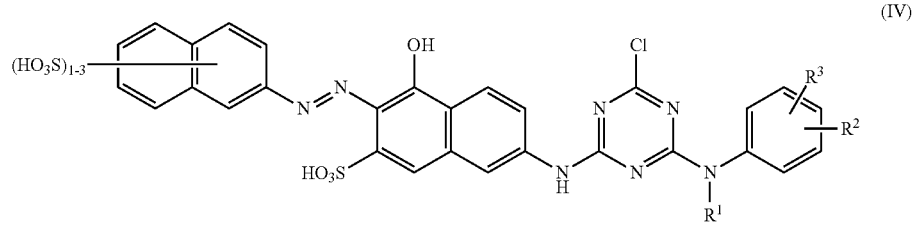

(IV)

wherein R¹ signifies H, methyl, ethyl; R² signifies —SO₃⁻X⁺; R³ signifies H, methyl or —SO₃⁻X⁺, wherein X⁺ signifies a cation selected from the group consisting of H⁺, Li⁺, Na⁺, K⁺, NR₄⁺ wherein R signifies one or more of H, $C_1$ to $C_6$ branched or unbranched alkyl residue; or mixtures of one or more of these cations;

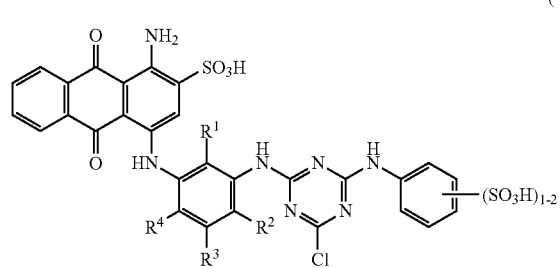

(V)

wherein R¹ and R⁴ signify independently of each other H, methyl, ethyl; R² signifies —SO₃⁻X⁺; R³ signifies H, methyl or —SO₃⁻X⁺, wherein X⁺ signifies a cation selected from the group consisting of H⁺, Li⁺, Na⁺, K⁺, NR₄⁺ wherein R signifies one or more of H, $C_1$ to $C_6$ branched or unbranched alkyl residue; or mixtures of one or more of these cations;

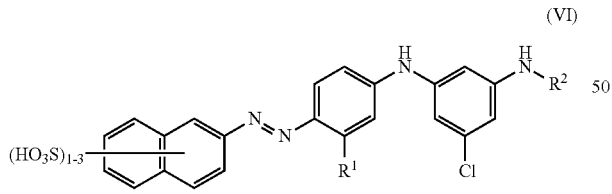

(VI)

wherein R¹ signifies —NHCONH₂, —NHCOCH₃; R² signifies H, phenyl, or phenyl substituted with one or two —SO₃⁻X⁻ groups, wherein X⁺ signifies a cation selected from the group consisting of H⁺, Li⁺, Na⁺, K⁺, NR₄⁺ wherein R signifies one or more of H, $C_1$ to $C_6$ branched or unbranched alkyl residue; or mixtures of one or more of these cations. Alternatively, the —SO₃H groups depicted in the above listed formulae (III) to (VI), may also be —SO₃X⁻ groups, wherein X⁺ signifies a cation selected from the group consisting of Li⁺, Na⁺, K⁺, NR₄⁺ wherein R signifies one or more of H, $C_1$ to $C_6$ branched or unbranched alkyl residue; or mixtures of one or more of these cations. Suitable reactive dyes are known under the following color index numbers (C.I. numbers): C.I. Reactive Red 24, C.I. Reactive Blue 49, C.I. Reactive Orange 12. The at least one reactive dye is optionally present in addition to the at least one cationic dye in the aqueous composition according to the invention. However, the presence of at least one reactive dye in the aqueous composition according to the invention is not mandatory. The at least one reactive dye can either not be present at all in the aqueous composition according to the invention, or can be present in an amount of at least 0.01% by weight, or at least 0.1% by weight, or at least 0.5% by weight, or at least 1% by weight, or at least 1.5% by weight, or at least 2% by weight and at most 7% by weight, or at most 6% by weight, or at most 5% by weight, or at most 4% by weight; or of 0 to at most 7% by weight, or at least 0.01 to at most 5% by weight or at least 0.1 to at most 4% by weight, based on 100% by weight of the total aqueous composition according to the invention.

The term "acid dye" as used within the context of the present application refers to dyes containing on more more acidic groups (e.g. sulphonic groups (—SO₃²⁻) or carboxylic groups (—CO₃²⁻). Due to the acidic groups, acid dyes are usually applied under acidic conditions. Suitable acid dyes are represented by the following formulae:

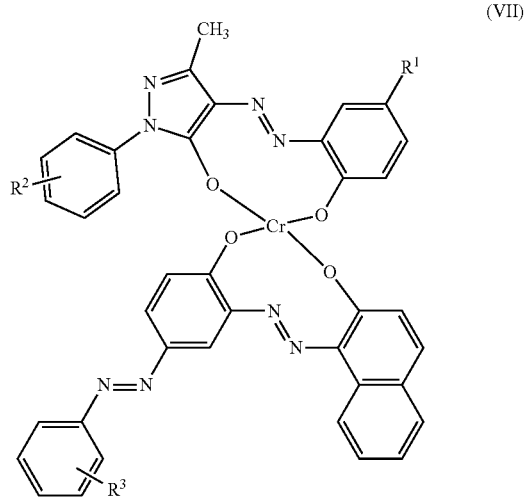

(VII)

wherein R¹ signifies —SO₃X⁻, —NO₂; R² signifies H, —SO₃⁻X⁺; R³ signifies H, —OCH₃; wherein X⁺ signifies a cation selected from the group consisting of H⁺, Li⁺, Na⁺, K⁺, NR$_4^+$ wherein R signifies one or more of H, $C_1$ to $C_6$ branched or unbranched alkyl residue; or mixtures of one or more of these cations;

(VIII)

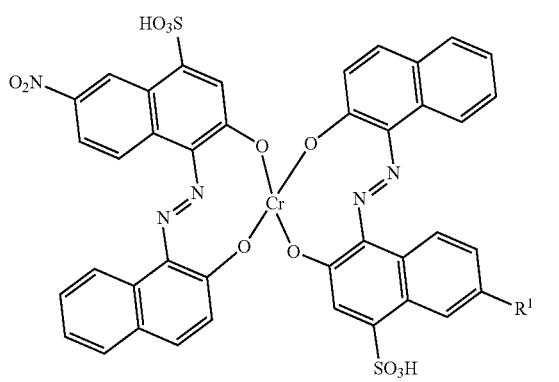

wherein $R^1$ signifies H, —NO$_2$.

(IX)

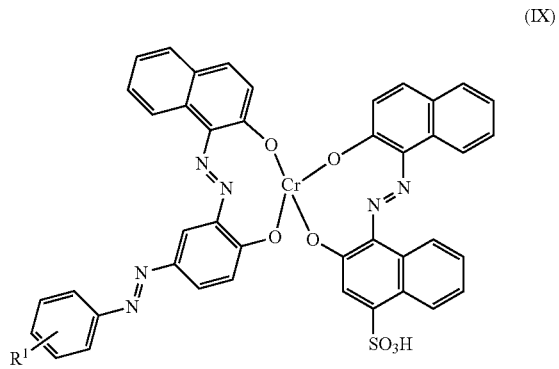

wherein $R^1$ signifies H, alkyl (in particular methyl, ethyl, branched or unbranched propyl or branched or unbranched butyl), —OR$^{2-}$; wherein $R^2$ signifies —CH$_3$, —CH$_2$CH$_3$, —CH$_2$CH$_2$OCH$_3$. Alternatively, the —SO$_3$H groups depicted in the above listed formulae (VII) to (IX), may also be —SO$_3$X⁻ groups, wherein X⁺ signifies a cation selected from the group consisting of Li⁺, Na⁺, K⁺, NR$_4^+$ wherein R signifies one or more of H, $C_1$ to $C_6$ branched or unbranched alkyl residue; or mixtures of one or more of these cations. Suitable acid dyes are known under the color index numbers (C.I. numbers): C.I. Acid Brown 289, C.I. Acid Brown 282, C.I. Acid Brown 283, C.I. Acid Brown 298, C.I. Acid Black 194, C. I. Acid Black 216, C. I. Acid Black 177, C. I. Acid Black 132, C. I. Acid Black 194. The at least one acid dye is optionally present in addition to the at least one cationic dye in the aqueous composition according to the invention. However, the presence of at least one acid dye in the aqueous composition according to the invention is not mandatory. The at least one acid dye can either not be present in the aqueous composition according to the invention or can be present in an amount of an amount of at least 0.01% by weight, or at least 0.1% by weight, or at least 0.5% by weight, or at least 1% by weight, or at least 1.5% by weight, or at least 2% by weight and at most 7% by weight, or at most 6% by weight, or at most 5% by weight, or at most 4% by weight; or of 0 To at most 7% by weight, or at least 0.01 to at most 5% by weight or at least 0.5 to at most 4% by weight, based on 100% by weight of the total aqueous composition according to the invention.

In the aqueous composition according to the invention, at least one cationic dye and at least one pigment preparation are present in order to provide a composition capable of coloring, preferably printing a fiber blend, yarn, woven, non-woven or knit fabric comprising or consisting of aramid, in particular para-aramid (which can only be colored, in particular printed, using cationic dyes, but cannot be colored, in particular printed using reactive or acid dyes) and acrylic, in particular PyroTex (which can be colored, in particular printed with cationic, acid and reactive dyes), wherein a high lightfastness is achieved although at least one cationic dye is used.

Figure 1B:
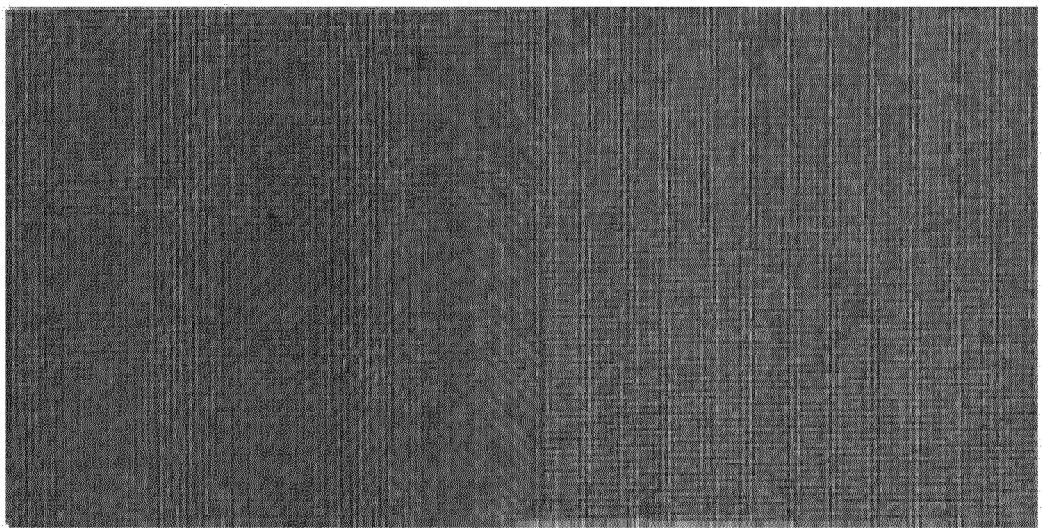
FIG. 1b shows a fabric printed with a composition according to the invention comprising a cationic dye and the dispersion comprising at least one pigment as described herein.

As mentioned above, cationic dyes have a rather poor light fastness. In the aqueous composition according to the invention, a dispersion containing at least one pigment is therefore used. The advantage of this dispersion containing at least one pigment is that the lightfastness of the cationic dye(s) is improved without negatively affecting other properties like the bright shade of cationic dyes. This technical effect is demonstrated in FIGS. 1a and 1b: FIG. 1a shows a fabric printed with a composition containing a cationic dye, but no dispersion containing at least one pigment (see "left column" of FIG. 1a under the heading "Not exposed"). From FIG. 1a, it can be clearly derived that the fabric is de-colored (light fastness rate of 1.5) when being exposed to light (see right "column" of the FIG. 1a under the heading "Exposed"). FIG. 1b shows a fabric printed with a composition according to the invention comprising a cationic dye and the dispersion comprising at least one pigment as described herein. The "left" column of FIG. 1b shows the fabric prior to the exposure to light (under the heading "not exposed"). The right "column" of FIG. 1b shows the fabric after having been exposed to light (under the heading "exposed"). As can be clearly derived from the pictures, the fabric colored with the aqueous composition according to the invention comprising at least one cationic dye and at least one dispersion comprising at least one pigment as described herein, is only slightly de-colored after being exposed to light achieving the required light fastness rate (4.0), while maintaining the bright shade. Light fastness rates according to Grey Scale are used for assessing change of shade ISO 105/A02. The light fastness rating is determined according to the number on the Grey Scale whose difference in color corresponds to that between the prints before the test and the prints after the test (40 hours in AATCC TM 16.3: 2014 Option 3). Further, the dispersion containing at least one pigment is capable of equipping the therewith treated fabric, in particular the fiber blend, yarn, woven, non-woven or knit fabric, with Infra-red reflection, i.e. with the ability to reflect IR light. The term "dispersion containing at least one pigment" as used within the context of the present application refers to liquid medium, in which pigment particles are finely and homogenously dispersed. The term "pigment" as used within the context of the present application refers to a colorant which is essentially not soluble in the liquid medium in which it is homogenously dispersed. Pigments can be of natural or synthetic origin and can be either organic or inorganic. Commonly known pigments are for example TiO$_2$ (white pigment), carbon black (black pigment), azo pigments like pigment red 146, pigment yellow 83, phthalo pigments like pigment blue 15:3, pigment green 7, pigment violet 23, indigo (blue pigment). Further suitable pigments are depicted in the following formula:

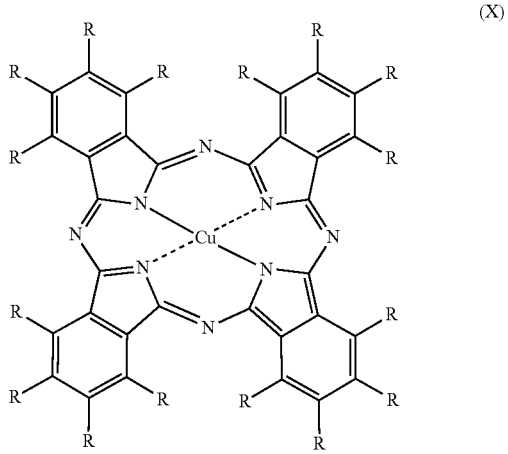

(X)

wherein R=H, Cl. Also, suitable pigments are known under the color index numbers (C.I. numbers): C.I. Pigment Yellow 83 (CAS: 5567-15-7), C.I. Pigment Yellow 139 (CAS: 36888-99-0), C.I. Pigment Yellow 42 (CAS: 51274-00-1), C.I. Pigment Red 146 (CAS: 5280-68-2), C.I. Pigment Red 122 (CAS: 980-26-7), C.I. Pigment Red 101 (CAS: 1309-37-1), C.I. Pigment Blue 28 (CAS: 68186-86-7), C.I. Pigment Blue 15:3 (CAS: 147-14-8), C.I. Pigment Green 7 (CAS: 1328-53-6), C.I. Pigment Green 17 (CAS: 1308-38-9), C.I. Pigment Black 7 (CAS: 1333-86-4). The liquid medium in which the at least one pigment is finely and homogenously milled and dispersed can be selected from water, polyglycol, or mixtures thereof. The dispersion can be designed as liquid, as semi-paste or as paste. In general, the concentration of the at least one pigment in the dispersion is at least 0.5% by weight and up to at most 7% by weight based on the total weight of the dispersion. The dispersion suitable to be used in the aqueous composition according to the invention can contain one pigment. The dispersion suitable to be used in the aqueous composition according to the invention can contain also two or more pigments. Dispersions comprising at least one pigment capable to be used in the aqueous composition according to the invention are known under the trade names Printofix (by Archroma) in general and Printofix T or TF in particular. A particular advantage of Printofix T and Printofix TF is that it is a water-based pigment dispersion having a good ecological profile with an excellent dispersion stability that allows easy printing paste preparation and very good performance during printing process. The dispersion comprising at least one pigment is present in an amount of at least 0.01% by weight, or at least 0.1% by weight, or at least 0.5% by weight, or at least 1% by weight and at most 3% by weight, or at most 2.5% by weight, or at most 2% by weight, or at least 0.01 to at most 3% by weight, or 0.01 to 2.5% by weight, or 0.05 to 2% by weight, or 0.1 to 1% by weight, or 0.1 to 0.5% by weight, based on 100% by weight of the total aqueous composition according to the invention.

The aqueous composition according to the invention comprises further at least one leveling agent. The leveling agent has the advantage to increase the color yield and the color strength on all fibers, e.g. on the aramid fibers and e.g. also on the acrylic fibers (e.g. Pyrotex fibers). By using the leveling agent, the color yield and color strength on the fibers can be increased by at least 15%, or at least 17%, or at least 20%, or at least 25%, or at least 30%, or at least 35% compared to a composition in which no leveling agent is used. In addition, the leveling agent has the advantage of improving the printing quality. The technical effects of the leveling agent are demonstrated in FIGS. 2a and 2b: FIG. 2a demonstrates a composition identical to the composition according to the invention except that no leveling agent is present in the composition. The relative color strength (K/S) of printed fabrics was measured by the light reflectance technique using the Kubelka-Munk equation. The reflectance (R) of printed fabrics was measured on a Konica Minolta MF-3700d (Japan). As can be seen in the upper picture of FIG. 2a, the color of the fabric is not homogenous and lacking color depth and bright shade (color strength=100%). The lower picture of FIG. 2a shows that the printing process resulted in designs bled at the boundaries thus resulting in a poor sharpness. The printed lines are interrupted. In contrast thereto, the fabric shown in FIG. 2b was printed with a composition according to the invention, i.e. containing the leveling agent. As can be seen from the upper picture of FIG. 2b, the color on the fabric is homogenous and of a satisfying color depth and brighter shade. This is due to the improvement of color yield and color strength (123%) by the leveling agent. The lower picture of FIG. 2b shows clear, sharp designs without any bled into the boundaries. Also, the lines are homogenously printed and very sharp. This is due to the ability of the leveling agent to improve the printing quality. The term "leveling agent" as used within the context of the present application refers to a chemical compound which is capable of slowing down the uptake of the dye by the fiber. The leveling agent contains chemical groups having attractive forces towards the dye. Since also between the dye and the fiber attractive forces are present, the attractive forces of the leveling agent creates kind of a counter balance to the attractive forces of the fiber towards the dye, thereby slowing down the uptake of the dye by the fiber during the printing process and thus resulting in the above mentioned and demonstrated advantages. There are anionic, cationic and non-ionic leveling agents known in the prior art. The at least one leveling agent present in the aqueous composition according to the invention is preferably selected from fatty acids; ethylene urea; fatty alcohol or sulphates thereof; fatty amines or sulphated fatty amine, alkyl aryl or sulphonates thereof; fatty alcohol ethylene oxide; alkyl phosphate salts; aliphatic polyglycol ether; acrylic copolymers; triazine derivates or mixtures thereof. Suitable leveling agents are known under the trade names Solidokol VN (nonionic, polyglycol ether), Primasol NF (anionic, alkyl phosphate salt), Printogen Additive CT (anionic triazine derivative) (all by Archroma), Lyoprint AP (Huntsman). The at least one leveling agent is present in the composition according to the invention in an amount of at least 4% by weight, or at least 4.5% by weight, or at least 5% by weight, or at least 6% by weight, or at least 7% by weight, and at most 12% by weight, or at most 11% by weight, or at most 10% by weight; or at least 4 to at most 12% by weight, or at least 5 to at most 11% by weight, or at least 6 to at most 10% by weight, based on 100% by weight of the total aqueous composition according to the invention.

The composition according to the invention is preferably applied to the fiber blend, yarn, woven, non-woven knit fabric as a printing paste. Thus, some certain amounts of solvent are necessary in order to dissolve the dye(s) and to be able to provide a homogenous printing paste in which all required compounds are homogenously distributed. The term "solvent" as used within the context of the present application refers to a liquid capable of dissolving at least the cationic and optionally the reactive or acid dye(s) such that the dye(s) can be homogenously distributed within the printing paste and thus can be homogenously printed onto the fiber blend, yarn, woven, non-woven or knit fabric. Commonly known solvents are aromatic alcohols or aliphatic alcohols having aromatic groups, or cyclic, heteroaliphatic derivatives. Suitable examples of solvents are benzyl alcohol, aromatic substituted propanol, aromatic substituted ethanol, aromatic substituted butanol, pyrrolidone derivatives. A suitable solvent is for example known under the tradename Printogen Enhancer PAW (carboxamide derivative mixture; by Archroma. This solvent has the advantage of having biodegradable properties (compared to e.g. benzyl alcohol). Thus, less wastewater treatment is necessary. The solvent is present in the aqueous composition according to the invention in an amount of at least 4% by weight, or at least 4.5% by weight, or at least 5% by weight, or at least 6% by weight, or at least 7% by weight, and at most 12% by weight, or at most 11% by weight, or at most 10% by weight; or at least 4 to at most 12% by weight, or at least 5 to at most 11% by weight, or at least 6 to at most 10% by weight, based on 100% by weight of the total aqueous composition according to the invention.

The term "stabilizer" as used within the context of the present application refers to a compound capable of improving the ionicity stability of the composition according to the invention. In the aqueous composition according to the invention, at least one cationic dye is present wherein the cationic dye carries cationic charges. Further, the dispersion comprising at least one pigment is present in the composition according to the invention. Such pigment dispersions are anionic. The attractive forces between the cationic dye and the pigment dispersions may adversely affect the stability of the composition according to the invention. In order to improve the stability of the aqueous composition according to the invention (e.g. in order to ensure a certain storage stability), at least one stabilizer can be added to the aqueous composition according to the invention. The at least one stabilizer can be selected from acrylate polymer(s), acrylamide copolymer(s), alkylphenol polyglycol ether or derivatives thereof, or mixtures thereof. Suitable stabilizers are known under the tradenames Dekol SN (aqueous solution of acrylic acid and maleic acid anhydride copolymer as sodium salt; by Archroma), Solidokoll DPR or Lyogen SMK. In case the at least one stabilizer is present in the aqueous composition according to the invention the amount is at least 0.1% by weight, or at least 0.5% by weight, or at least 1% by weight, and at most 4% by weight, or at most 3.5% by weight, or at most 3% by weight. Or the at least one stabilizer is present in the aqueous composition according to the invention the amount 0 to 4% by weight, or 0.1 to 4% by weight, or 0.5 to 2% by weight, based on 100% by weight of the total aqueous composition according to the invention.

The composition according to the invention further comprises at least one binder. The at least one binder has the advantage of forming a film on the substrate to which the binder is applied. In the present case, the binder forms a film on the fabric, in particular the fiber blend, yarn, woven, non-woven or knit fabric. By the film formation the at least one pigment present in the composition according to the invention is fixed on the fabric, in particular the fiber blend, yarn, woven, non-woven or knit fabric. Therefore, under the term "binder" as used within the context of the present application, a composition is to be understood, capable of forming a film on the substrate to which it is applied and thereby fixing pigment(s) onto the substrate. The binder as present in the composition of the invention is designed as aqueous dispersion comprising a liquid medium and therein dispersed polymer particles. The liquid medium comprises or consists of water, one or more surfactants or mixtures thereof. Preferably, the liquid medium does not contain any organic solvent. This has the advantage that the binder then has a low flammability. The polymer particles dispersed in the liquid medium have an average particles size of 120 to 300 nm. The polymer particles are responsible for forming the film. The liquid medium is the reaction medium for forming the polymer particles and functions as stabilizer for the therein dispersed polymer particles during transport and storage. The polymer particles dispersed within the liquid medium are manufactured by way of emulsion polymerization. The monomers of which the polymer particles should be made of are dispersed within the liquid medium, and polymerization is initiated by means of free radical polymerization. Suitable monomers are unsaturated monomers selected from the group comprising vinyl chloride, dichloroethane, acrylic acid, methacrylic acid, acrylamide, acrylonitrile, acrylic acid esters, vinyl esters, styrene, diolefins, like butadiene, or mixtures thereof. The binder comprises at high amounts of polymer particles, in particular at least 35% by weight, or at least 40% by weight, or at least 45% by weight or at most 50% by weight, based on the total weight of the binder, wherein the remainder up to 100% by weight is made of the liquid medium which is water, surfactant or mixtures thereof. As mentioned, the binder as used within the composition according to the invention is designed as dispersion as defined above, and thus, is present in the composition according to the invention as dispersion comprising or consisting of polymer particles dispersed within a liquid medium. The film forming on the substrate to which the binder (or in the present case, the composition according to the invention) is applied, takes place, once the substrate (in the present case, the fiber blend, yarn, woven, non-woven or knit fabric) is subjected to a heating step, in particular a drying step. The liquid medium then is removed e.g. by evaporation and the formerly dispersed polymer particles coagulate and flow together, thereby forming a three-dimensionally network, i.e. the film, within which the pigments are entrapped. Since the film is a three-dimensionally network, fixation of said film on the substrate, in particular the fiber blend, yarn, woven, non-woven or knit fabric is achieved. Consequently, it is another advantage of the binder to ensure that the entrapped pigment is fast to wear and cleaning. Suitable polymers are for example poly(butyl acrylate), copolymer of butyl(acrylate), ethyl(acrylate) and styrene, polyvinyl acrylate, acrylonitrile, or mixtures thereof. Suitable binders are known under the tradenames Helizarin One (acryl vinyl copolymer aqueous dispersion; by Archroma), Cresacryl, Unicryl or Tubifast. The at least one binder is present in the composition according to the invention in an amount of at least 0.5% by weight, or at least 1% by weight, or at least 2% by weight, or at least 3% by weight, or at least 4% by weight and at most 12% by weight, or at most 10% by weight, or at most 8% by weight, or at most 7% by weight, or at least 0.5 to 12% by weight, or at least 1 to 10% by weight, or at least 2 to 8% by weight based on the total weight of the aqueous composition according to the invention.

Since the composition according to the invention is an aqueous composition, the remainder up to 100% by weight is water.

In addition, the composition according to the invention may comprise one or more additives selected from the group comprising thickener, acid donor, or mixtures thereof. The thickener may be present in the aqueous composition according to the invention in an amount of 0 to 8% by weight, or 1 to 5% by weight based on the total weight of the aqueous composition according to the invention. The acid donor may be present in the aqueous composition according to the invention in an amount of 0 to 5%, or 1 to 3% by weight based on the total weight of the aqueous composition according to the invention.

In one embodiment, the aqueous composition according to the invention, comprises at least 0.01 to at most 7% by weight of at least one cationic dye, at least 0.01 to at most 3% by weight of at least one dispersion comprising at least one pigment; at least 4 to at most 12% by weight of at least one solvent; at least 4 to at most 12% by weight of at least one leveling agent; 0.5 to 12% by weight of at least one binder, based on 100% by weight of the total aqueous composition according to the invention. Since the composition according to the invention is an aqueous composition, the remainder up to 100% by weight is water.

The aqueous composition according to the invention can also comprise 0.01 to 5% by weight, or 0.1 to 4% by weight of at least one cationic dye; 0 to at most 7% by weight, or at least 0.01 to at most 5% by weight of at least one reactive dye and/or at least one acid dye; at least 0.01 to at most 2.5% by weight, or at least 0.05 to at most 2% by weight of at least one dispersion comprising at least one pigment; at least 5 to at most 11% by weight, or at least 6 to at most 10% by weight of at least one solvent; at least 5 to at most 11% by weight, or 6 to 10% by weight of at least one leveling agent; at least 1 to at most 10% by weight, or 2 to at most 8% by weight of at least one binder, 0.1 to 4% by weight, or 0.5 to 2% by weight of at least one stabilizer, based on 100% by weight of the total aqueous composition according to the invention. Since the composition according to the invention is an aqueous composition, the remainder up to 100% by weight is water.

The present invention further relates to a process for manufacturing the aqueous composition according to the invention. The process according to the invention comprises or consists of the following steps: Step A, Step B and Step C.

Step A: In step A, all components for the composition according to the invention are mixed and homogenized, except the dye(s), in particular at least one cationic dye and the at least one dispersion comprising at least one pigment. Step A results in a paste, also called "stock paste" in the following. Mixing and homogenizing can be conducted in conventionally used equipment for mixing and homogenizing components for pastes, in particular printing pastes or stock pastes. A preferred equipment for step A is an ultra-shear mixing blade. The mixing and homogenizing of the components can be conducted for any suitable time at any suitable steering rate, for example for 5 to 15 minutes at a steering speed of 200 rpm to 4000 rpm.

Step B: Addition of the at least one cationic dye and the at least one dispersion comprising at least one pigment, optionally the at least one reactive or acid dye, to the mixture obtained in step A. The addition of the dye(s) and dispersion(s) can be conducted simultaneously, or one after the other. Also it is possible, to mix the dye(s) and the dispersion(s) before being added to the mixture obtained in Step A. In addition, it is possible to conduct Step B immediately after Step A. It is also possible that the mixture obtained in Step A is stored for a certain time period, before being subjected to Step B. In addition, it is possible to add further components besides the dye(s) and dispersion(s) to the mixture obtained in Step A in Step B. It is also possible that the further components are pre-mixed with one or more dye(s) and dispersion(s) before being added to the mixture obtained in Step A.

Step C: Mixing and homogenizing the mixture obtained in Step B. Mixing and homogenizing can be conducted in conventionally used equipment for mixing and homogenizing components for pastes, in particular printing pastes or stock pastes. A preferred equipment for step C is a high-speed mixer. Step C can be conducted immediately after Step B. It is also possible that the mixture obtained in Step B is stored for a certain time period, before being subjected to Step C. Once Step C is finalized, the aqueous composition according to the invention is ready for use, i.e. ready for being applied to the fiber, yarn, woven, non-woven or knit fabric. Preferably, the composition according to the invention is designed as printing paste after Step C is finalized.

Further, it is possible that additional steps are conducted prior to Step A, after Step C or in between Steps A, B and/or C. Possible steps are for example heating steps, cooling steps, sieving steps.

The present invention further relates to the use of the aqueous composition according to the invention or the use of the aqueous composition manufactured according to the process according to the invention for coloring, in particular printing fabrics, in particular fiber blends, yarn, woven, non-woven or knit fabrics wherein the said fabrics, in particular fiber blends, yarn, woven, non-woven or knit fabrics comprise or consist of aramid, in particular para-aramid, and acrylic, in particular Pyrotex, and optionally wool.

The present invention also relates to a process for coloring, in particular printing a fiber blend, yarn, woven, non-woven or knit fabric comprising or consisting of aramid, in particular para-aramid and acrylic, in particular Pyrotex, and optionally wool, wherein the process comprises the following steps: Step 1 to 6:

Step 1: Printing the fiber blend, yarn woven, non-woven or knit fabric using the aqueous composition according to the invention or using the aqueous composition made according to the process according to the invention. In this step, the composition is preferably designed as printing paste. The printing is conducted by conventional methods as described above. Preferably the printing is conducted using a rotative or flat printing machine.

Step 2: Drying of the printed fiber blend, yarn, woven, non-woven or knit fabric obtained in Step 1. The drying step is conducted at temperatures of at least 100° C., or at least 110° C., or at least 120° C., or at least 125° C., or at least 130° C., or at least 135° C. The temperature should be at most 200° C., or at most 190° C., or at most 180° C., or at most 170° C., or at most 160° C., or at most 155° C., or at most 150° C., or at most 145° C., or at most 140° C. Step 2 can be immediately conducted after Step 1. It is also possible that the printed fiber blend, yarn, woven, non-woven or knit fabric in Step 1 is stored for a certain time period, before being subjected to Step 2.

Step 3: Fixation of the at least one cationic dye present in the composition according to the invention or manufactured according to the process according to the invention on the fiber blend, yarn, woven, non-woven or knit fabric by subjecting the printed fiber blend, yarn, woven, non-woven or knit fabric obtained in Step 2 to a steam process by applying saturated steam at a temperature of at least 90° C., at least 95° C., at least 100° C., and at most 105° C., or at most 110° C. The steam is applied for at least 10 minutes, or at least 15 minutes, or at least 20 minutes, or at least 30 minutes, but not longer than 50 minutes, or not longer than 45 minutes or not longer than 40 minutes. Step 3 can be immediately conducted after Step 2. Also, if at least one acid dye and/or at least one reactive dye is present in the composition according to the invention, fixation of these one or more dyes takes place in this step 3. It is also possible that the printed fiber blend, yarn, woven, non-woven or knit fabric of Step 2 is stored for a certain time period, before being subjected to Step 3.

Step 4: Subjecting the printed fiber blend, yarn, woven, non-woven or knit fabric obtained in Step 3 to a curing step to fix the at least one pigment (originating from the at least one dispersion). The curing step is conducted at a temperature of at least 130° C., at least 140° C., or at least 145° C. The temperature should be at most 200° C., or at most 190° C., or at most 180° C., or at most 170° C., or at most 160° C., or at most 155° C., or at most 150° C. for at least 1 minute, or for at least 2 minutes, or for at least 3 minutes, or for at least 4 minutes and not longer than 5 minutes or no longer than 6 minutes or no longer than 7 minutes. Step 4 can be immediately conducted after Step 3. It is also possible that the printed fiber blend, yarn, woven, non-woven or knit fabric of Step 3 is stored for a certain time, before being subjected to Step 4.

Step 5: Subjecting the printed fiber blend, yarn, woven, non-woven or knit fabric obtained in Step 4 to a washing step. The washing step can comprise one or more of the following procedures: cold rinse, warm rinse, and/or hot soaping. Step 5 can be immediately conducted after Step 4. It is also possible that the printed fiber blend, yarn, woven, non-woven or knit fabric of Step 4 is stored for a certain time, before being subjected to Step 5.

Step 6: Subjecting the printed fiber blend, yarn, woven, non-woven or knit fabric obtained in Step 5 to a final drying step at a temperature of at least 100° C. up to 200° C.

Further, it is possible that additional steps are conducted prior to Step 1, after Step 6 or in between Steps 1 to 6. Possible steps are for example heating steps, cooling steps, sieving steps, mixing steps.

The invention further relates to a colored, in particular printed fiber blend, yarn, woven, non-woven or knit fabric comprising or consisting of acrylic, in particular Pyrotex and aramid, in particular para-aramid. Preferably wool is also present in the fiber blend, yarn, woven, non-woven or knit fabric. The printed fiber blend, yarn, woven, non-woven or knit fabric according to the invention comprises as colorant at least one cationic dye and at least one pigment, originating from the aqueous composition according to the invention, or from the aqueous composition produced according to the process according to the invention. The printed fiber blend, yarn, woven, non-woven or knit fabric according to the invention, preferably comprises or consists of 30 to 50% by weight of acrylic, in particular Pyrotex, 30 to 50% by weight of aramid, in particular para-aramid, and 0 to 25% by weight of wool based on 100% by weight of the fiber blend, yarn, woven, non-woven or knit fabric.

The invention further relates to colored, in particular printed fiber blend, yarn, woven, non-woven or knit fabric comprising or consisting of aramid, in particular para-aramid and acrylic, in particular Pyrotex and further optionally wool wherein the fiber blend, yarn, woven, non-woven or knit fabric is printed according to the process according to the invention or printed with the aqueous composition according to the invention, or printed with the aqueous composition produced according to the invention.

The present invention further relates to colored, in particular printed fiber blend, yarn, woven, non-woven or knit fabric according to the invention used for manufacturing protection cloth for army and police uniforms and equipment like backpacks, camping tents or ownings.

EXAMPLES

In the following, the invention is explained in more detail, however, without being restricted to the following examples.

Fabric: A fabric made of a fiber blend of Pyrotex, para-aramid and wool were used throughout the following examples (from Pyrotex Industries GmbH (Hamburg—Germany)). The fabric was washed with a solution containing 1 g/l nonionic detergent (Kieralon OLB, Archroma) and 1 g/l sodium carbonate at a liquor ratio of 50:1 for 30 min at the boil, after which time it was thoroughly rinsed and dried at room temperature.

Dyes and chemicals: The cationic dyes used were: Basic Yellow 24 and 82; Basic Red 14 and 29; Basic Blue 3 and 54. The pigment containing dispersions used were: Printofix (Archroma) containing Pigment Yellow 83 and 139; Pigment Red 101 and 146; Pigment Blue 15:3 and 28; Pigment Black 7. The binder used was Helizarin One (Archroma). As solvent Printogen Enhancer PAW (Archroma) was used. As leveling agent Printogen Additive CT (Archroma) was used. Further, a stabilizer (Lyogen SMK by Archroma), an acid donor (ammonium tartrate), urea and a thickener (guar gum of medium viscosity (Polygal AC—CH)) were of laboratory reagent grade and applied without further purification.

Stock paste: A mixing vessel was charged with 10 liters of water and mixed under stirring with 3 kg of ammonium tartrate. A mixing vessel was charged with 50 kg of thickener paste (92 liters of water and 8 kg thickener) and finalized into a stock paste by mixing under stirring 10 kg water, 10 kg of urea, 8 kg of Printogen Additive CT, 4 kg of Printogen Enhancer PAW, 2 kg of Lyogen SMK, 2 kg of binder, 4.5 kg of ammonium tartrate solution (30% w/v). This mixture was stirred for another 15 minutes. The stock paste was completed up to 100 kg with water and subsequently, stirred for another 15 minutes and cooled down to room temperature.

Printing paste: Subsequently, for each desired shade, dyes were solubilized and mixed with pigments as follows: A mixing vessel was charged with cationic dyes, subsequently solubilized with boiling water and acetic acid by % weight of cationic dyes. Stock paste was added to the mixture followed by the pigment dispersion up to 100% by weight. The following compositions according to the invention (printing pastes) were prepared (% w/w) as can be derived from the following table:

|  | Printing paste "Dark green" (Example 1) | Printing Paste "Olive green" (Example 2) | Printing Paste "Brown" (Example 3)* |
|---|---|---|---|
| Basic Yellow 24 | 0.6 | 0.27 | — |
| Basic Yellow 82 | — | — | 0.64 |
| Basic Red 14 | 0.1 | — | 0.28 |
| Basic Red 29 | — | 0.044 | — |
| Basic Blue 3 | 0.4 | — | 0.25 |
| Basic Blue 54 | — | 0.12 | — |
| Acetic acid | 1.1 | 0.434 | 1.17 |
| Boiling water | 1.1 | 0.434 | 1.17 |
| Stock paste | 95.05 | 98.303 | 95.86 |
| Pigment Yellow 83 | 0.31 | — | 0.33 |
| Pigment Yellow 139 | — | 0.15 | — |
| Pigment Red 101 | — | — | 0.13 |
| Pigment Red 146 | 0.1 | 0.02 | — |

-continued

|  | Printing paste "Dark green" (Example 1) | Printing Paste "Olive green" (Example 2) | Printing Paste "Brown" (Example 3)* |
|---|---|---|---|
| Pigment Blue 15:3 | — | — | 0.12 |
| Pigment Blue 28 | 0.2 | 0.2 | — |
| Pigment Black 7 | 0.04 | 0.025 | 0.05 |

*A fabric printed with the printing paste according to Example 3 is shown in FIG. 2b.

Comparative Example 1: A printing paste "Dark Green" according to Example 1 (table above) was manufactured with the sole difference that in the stock paste no leveling agent (Printogen Additive CT) was included.

Comparative Example 2: A printing paste "Olive green" according to Example 2 (table above) was manufactured with the sole difference that in the stock paste no leveling agent (Printogen Additive CT) was included.

Comparative Example 3: A printing paste "Brown" according to Example 3 (table above) was manufactured with the sole difference that in the stock paste no leveling agent (Printogen Additive CT) was included. A fabric printed with this printing paste according to Comparative Example 3 is shown in FIG. 2a.

Comparative Example 4: A printing paste "Dark Green" according to Example 1 (table above) was manufactured with the sole difference that in the stock paste neither leveling agent (Printogen Additive CT) nor a dispersion containing at least one pigment (Printofix) were included.

Comparative Example 5: A printing paste "Olive Green" according to Example 2 (table above) was manufactured with the sole difference that in the stock paste neither leveling agent (Printogen Additive CT) nor a dispersion containing at least one pigment (Printofix) were included.

Comparative Example 6: A printing paste "Brown" according to Example 3 (table above) was manufactured with the sole difference that in the stock paste neither leveling agent (Printogen Additive CT) nor a dispersion containing at least one pigment (Printofix) were included.

Printing application (process for printing fabric according to the invention) with composition according to the invention: The above described printing pastes of Examples 1 to 3 as well as of Comparative Examples 1 to 6 according to the invention were applied to the fabric by conventional flat screen-printing method (J. Zimmer, GmbH; Austria—Mini MDF/796). Fixation of the prints were made by drying at 100° C. for 1 min, followed by steaming for 40 min at 102° C. and followed by curing at 160° C. for 3 min. Subsequently, the prints made were rinsed with cold water and soaped with 2 g/l cationic detergent (Lyogen WD liq) at 40° C. and 60° C. for 10 min, thoroughly rinsed and air dried. Fine quality prints according to the invention (Print Example 1 printed with printing paste according to Example 1; Print Example 2 printed with printing paste according to Example 2; Print Example 3 printed with printing paste according to Example 3) with high wet and light fastness properties were obtained following this printing process according to the invention.

Measurement Methods

Color strength: The relative color strength (K/S) of printed fabrics was measured by the light reflectance technique using the Kubelka-Munk equation. The reflectance (R) of printed fabrics was measured on a Konica Minolta MF-3700d (Japan).

Leveling properties: The leveling properties of printed fabrics at the selected printing conditions was assessed on a Konica Minolta MF-3700d by measuring the color differences within each sample at five separate points and the average color difference (dE) between these points was determined. dE indicates the delta variation between two shades and is a measure for the leveling properties (the closer the value for dE to 0 is, the better are the leveling properties). The obtained shades were as the following table: In the table, L* indicates lightness, a* is the red/green coordinate, and b* is the yellow/blue coordinate in the CIE LAB color system.

| Print comparison | L* | a* | b* | C* | h* | dE | Color strength |
|---|---|---|---|---|---|---|---|
| Dark green-targeted shade | 41.16 | −6.54 | 14.04 | 15.49 | 114.97 | — | — |
| Print Example 1 "Dark green" (printing paste according to Example 1) | 41.15 | −6.58 | 14.02 | 15.48 | 115.13 | 0.05 | 121% |
| Print Comp. Ex. 1 "Dark green" (printing paste according to Comp. Ex. 1) | 38.01 | −5.38 | 11.89 | 14.37 | 110.1 | 3.45 | 100% |
| Olive green-targeted shade | 52.53 | 0.31 | 19.82 | 19.83 | 89.10 | — | — |
| Print Example 2 "Olive green" (printing paste according to example 2) | 52.51 | 0.26 | 19.88 | 19.88 | 89.24 | 0.07 | 129% |
| Print Comp. Ex. 2 "Olive green" (printing paste according to Comp. Ex. 2) | 50.31 | 1.39 | 21.75 | 22.66 | 86.1 | 4.1 | 100% |
| Brown-targeted shade | 36.5 | 5.96 | 12.79 | 14.11 | 65.01 | — | — |
| Print Example 3 "Brown" (printing paste according to example 3) | 36.54 | 5.89 | 12.79 | 14.08 | 65.27 | 0.08 | 123% |
| Print Comp. Ex. 3 "Brown" (printing paste according to Comp. Ex. 3) | 31.2 | 3.89 | 10.5 | 12.89 | 61.88 | 5.1 | 100% |

From the results of the above table, it is shown that the fabrics printed with the compositions according to the invention (i.e. the printing pastes "Dark Green", "Olive Green" and "Brown" according to Examples 1 to 3) show very good leveling properties as well as an increased color strength of at least 21% compared to the respective Comparative Examples.

Color fastness to light: is determined according to AATCC TM 16.3: 2014 option 3. This test method provides the general principles and procedures for determining the colorfastness to light of textile materials. The test options described are applicable to textile materials of all kinds and for colorants, finishes and treatments applied to textile materials. Test options included are: 1) Xenon—Arc Lamp, Alternate Light and Dark; 2) Xenon-Arc Lamp, Continuous Light, Black Standard Option; 3) Xenon-Arc Lamp, Continuous Light, Black Panel Option. These tests were carried out in a Atlas Xenon-Arc weather-ometer model Ci 3000+ during 40 hours at a temperature of 40° C. The results are summarized in the following table:

| Print comparison | L* | a* | b* | Light fastness AATCC TM1 6.3 |
|---|---|---|---|---|
| Print Comp. Ex. 4 "Dark green" (printing paste according to Comp. Ex. 4) | 38.01 | −5.38 | 11.89 | 1.1 |
| Print Example 1 "Dark green" (printing paste according to Example 1) | 41.15 | −6.58 | 14.02 | 3.8 |
| Print Comp. Ex. 5 "Olive green" (printing paste according to Comp. Ex. 5) | 50.31 | 1.39 | 21.75 | 1.7 |
| Print Example 2 "Olive green" (printing paste according to example 2) | 40.7 | −6.32 | 13.57 | 4.0 |
| Print Comp. Ex. 6 "Brown" (printing paste according to Comp. Ex. 6)* | 31.2 | 3.89 | 10.5 | 1.5 |
| Print Example 3 "Brown" (printing paste according to example 3)* | 36.54 | 5.89 | 12.79 | 4.0 |

*Fabric according to Print Comp. Ex. 6 is shown in FIG. 1a and fabric according to Print Ex. 3 is shown in FIG. 1b In the above table, L* indicates lightness, a* is the red/green coordinate, and b* is the yellow/blue coordinate in the CIE LAB color system. Light fastness rates according to Grey Scale are used for assessing change of shade ISO 105/A02. The light fastness rating is determined according to the number on the Grey Scale whose difference in color corresponds to that between the prints before the test and the prints after the test. After 40 hours in AATCC TM 16.3: 2014 Option 3, the print application according to invention showed a higher degree of light fastness (the higher the number, the better the light fastness).

The invention claimed is:

1. An aqueous composition for printing a fiber blend, yarn, woven, non-woven or knit fabric comprising or consisting of acrylic and aramid, wherein the composition comprises:
   a) at least one cationic dye,
   b) at least one dispersion comprising at least one pigment,
   c) at least one leveling agent in an amount of from 4% to 12% by weight and selected from fatty acids, ethylene urea, fatty alcohol or sulphates thereof, fatty amines or sulphated fatty amine, alkyl aryl or sulphonates thereof, fatty alcohol ethylene oxide, phosphatic salts, aliphatic polyglycol ether, triazine derivates, or mixtures thereof,
   d) at least one solvent in an amount from 4 to 12% by weight and selected from aromatic alcohols or aliphatic alcohols having aromatic groups, or aliphatic heterocyclic derivatives, and
   e) at least one binder in an amount of from 0.5% to 12% by weight and selected from poly(butyl acrylate), copolymer of butyl(acrylate), ethyl(acrylate) and styrene, polyvinyl acrylate, acrylonitrile, or mixtures thereof, wherein the % by weight is based on 100% by weight of the total aqueous composition.

2. The aqueous composition according to claim 1, wherein the composition further comprises at least one reactive dye or at least one acid dye.

3. The aqueous composition according to claim 1, wherein the composition further comprises at least one stabilizer selected from acrylate polymer(s), acrylamide copolymer(s), alkylphenol polyglycol ether, or mixtures thereof.

4. The aqueous composition according to claim 1 wherein the composition further comprises additives selected from a thickener, acid donor, or mixtures thereof.

5. The aqueous composition according to claim 1, wherein the composition comprises:
   0.01 to 7% by weight of the at least one cationic dye;
   0.01 to 3% by weight of the at least one dispersion comprising at least one pigment;
   0 to 4% by weight of at least one stabilizer;
   0 to 7% by weight of at least one reactive dye or 0 to 7% by weight of at least one acid dye;
   0 to 8% by weight of at least one thickener; and
   0 to 5% by weight acid donor;
   based on 100% by weight of the total composition, wherein the remainder to 100% by weight is water.

6. The aqueous composition according to claim 1, wherein the composition comprises:
   0.1 to 5% by weight of the at least one cationic dye;
   0.01 to 5% by weight of at least one reactive dye or 0.01 to 5% by weight of at least one acid dye;
   1 to 10% by weight of the at least one binder;
   0.01 to 2.5% by weight of the at least one dispersion comprising at least one pigment;
   5 to 11% by weight of the at least one solvent;
   5 to 11% by weight of the at least one leveling agent;
   0.1 to 4% by weight of at least one stabilizer,
   1 to 5% by weight of at least one thickener; and
   1 to 3% by weight of at least one acid donor;
   based on 100% by weight of the total composition, wherein the remainder to 100% by weight is water.

7. A process for manufacturing the aqueous composition according to claim 1, comprising the following steps:
   Step A: Mixing and homogenizing all components for the composition, except the at least one cationic dye and the at least one dispersion comprising the at least one pigment;
   Step B: Adding the at least one cationic dye and the at least one dispersion comprising the at least one pigment to the mixture obtained in Step A; and
   Step C: Mixing and homogenizing the mixture obtained in Step B.

8. A process for printing a fiber blend, yarn, woven, non-woven or knit fabric comprising or consisting of acrylic and aramid and optionally wool comprising the following steps:
   Step 1: Printing the fiber blend, yarn, woven, non-woven or knit fabric using the aqueous composition according to claim 1;
   Step 2: Drying of the printed fiber blend, yarn, woven, non-woven or knit fabric obtained in Step 1 at temperatures of between 100° C. to 200° C.;
   Step 3: Fixation of the at least one cationic dye present in the aqueous composition on the fiber blend, yarn, woven, non-woven or knit fabric by subjecting the printed fiber blend, yarn, woven, non-woven or knit fabric obtained in Step 2 to a steam process by applying saturated steam for at least 10 minutes and up to 50 minutes at a temperature of at least 90° C. up to 110° C.;

Step 4: Subjecting the printed fiber blend, yarn, woven, non-woven or knit fabric obtained in Step 3 to a curing step at a temperature of at least 130° C. up to 200° C. for at least 1 minutes up to 7 minutes;

Step 5: Subjecting the printed fiber blend, yarn, woven, non-woven or knit fabric obtained in Step 4 to a washing step; and Step 6: Subjecting the printed fiber blend, yarn, woven, non-woven or knit fabric obtained in Step 5 to a final drying step at a temperature of at least 100° C. up to 200° C.

9. A printed fiber blend, yarn, woven, non-woven or knit fabric comprising or consisting of acrylic and aramid and optionally wool, wherein the fiber blend, yarn, woven, non-woven or knit fabric comprises as colorant at least one cationic dye and at least one pigment originating from the aqueous composition according to claim 1.

10. The printed fiber blend, yarn, woven, non-woven or knit fabric according to claim 9, wherein the printed fiber blend, yarn, woven, non-woven or knit fabric comprises 30 to 50% by weight of acrylic, 30 to 50% by weight of aramid and 0 to 25% by weight of wool based on 100% by weight of the fiber blend, yarn, woven, non-woven or knit fabric.

11. A printed fiber blend, yarn, woven, non-woven or knit fabric comprising or consisting of acrylic, aramid and optionally wool, wherein the fiber blend, yarn, woven, non-woven or knit fabric is printed according to the process as claimed in claim 8.

12. The printed fiber blend, yarn, woven, non-woven or knit fabric according to claim 9 wherein the fiber blend, yarn, woven, non-woven or knit fabric is used for manufacturing protection cloth for army and police uniforms and equipment including backpacks, camping tents or ownings.

13. A printed fiber blend, yarn, woven, non-woven or knit fabric comprising or consisting of acrylic, aramid and optionally wool, wherein the fiber blend, yarn, woven, non-woven or knit fabric is printed with the aqueous composition according to claim 1.

14. A printed fiber blend, yarn, woven, non-woven or knit fabric comprising or consisting of acrylic, aramid and optionally wool, wherein the fiber blend, yarn, woven, non-woven or knit fabric is printed with the aqueous composition produced according to claim 7.

* * * * *